(12) United States Patent
Wu et al.

(10) Patent No.: US 11,499,783 B2
(45) Date of Patent: Nov. 15, 2022

(54) HEATING AND/OR COOLING SYSTEM AND METHOD FOR REDUCING OR REMOVING SOLIDIFIED PHASE CHANGE MATERIAL

(71) Applicant: Mitsubishi Electric Corporation, Chiyoda-ku (JP)

(72) Inventors: Duan Wu, Livingston (GB); Georgeanna Kawaley, Livingston (GB)

(73) Assignee: Mitsubishi Electric Corporation, Chiyoda-ku (JP)

( * ) Notice: Subject to any disclaimer, the term of this patent is extended or adjusted under 35 U.S.C. 154(b) by 428 days.

(21) Appl. No.: 16/826,672

(22) Filed: Mar. 23, 2020

(65) Prior Publication Data
US 2020/0309457 A1 Oct. 1, 2020

(30) Foreign Application Priority Data
Mar. 29, 2019 (EP) .................................... 19166213

(51) Int. Cl.
| | | |
|---|---|---|
| *F28D 15/00* | (2006.01) | |
| *F28B 9/08* | (2006.01) | |
| *F24F 5/00* | (2006.01) | |
| *F28D 20/00* | (2006.01) | |
| *F25D 11/00* | (2006.01) | |
| *F28D 20/02* | (2006.01) | |

(52) U.S. Cl.
CPC .............. *F28B 9/08* (2013.01); *F24F 5/0021* (2013.01); *F28D 20/0056* (2013.01); *F25D 11/006* (2013.01); *F28D 20/02* (2013.01)

(58) Field of Classification Search
CPC ...... F28B 9/08; F24F 5/0021; F25D 20/0056; F25D 11/006; F25D 20/02

USPC ..................................................... 165/104.17
See application file for complete search history.

(56) References Cited

FOREIGN PATENT DOCUMENTS

| | | |
|---|---|---|
| DE | 20 2012 101 093 U1 | 8/2012 |
| JP | 2005-241145 A | 9/2005 |
| JP | 2005-241146 A1 | 9/2005 |
| JP | 2007-107773 A | 4/2007 |
| JP | 2004-163005 A | 6/2007 |

OTHER PUBLICATIONS

Combined Chinese Office Action and Search Report dated Jul. 26, 2021 in Chinese Patent Application No. 202010209266.2 (with unedited computer generated English translation), 13 pages.
European Search Report dated Nov. 27, 2019 in European Application 19166213.9 filed Mar. 29, 2019, 6 pages.
Zhang, P. et al., "An overview of fundamental studies and applications of phase change material slurries to secondary loop refrigeration and air conditioning systems," Renewable and Sustainable Energy Reviews, vol. 16, 2012, pp. 5021-5058, XP-002794664.
Office Action dated Jun. 28, 2022 issued in corresponding Japanese patent application No. 2020-050961 (and English translation).

*Primary Examiner* — Davis D Hwu
(74) *Attorney, Agent, or Firm* — Oblon, McClelland, Maier & Neustadt, L.L.P.

(57) ABSTRACT

The disclosure relates to a heating and/or cooling system having an energy conversion device included in a refrigerant circuit and having reducing means for reducing and/or removing solidified phase change material from a component of a heat transfer circuit, wherein the reducing means are driven by energy provided from the energy conversion device. The disclosure also relates to a corresponding method for reducing or removing solidified phase change material.

14 Claims, 4 Drawing Sheets

HEATING AND/OR COOLING SYSTEM AND METHOD FOR REDUCING OR REMOVING SOLIDIFIED PHASE CHANGE MATERIAL

FIELD OF THE INVENTION

The disclosure relates to a heating and/or cooling system having an energy conversion device included in a refrigerant circuit and having reducing means for reducing and/or removing solidified phase change material from a component of a heat transfer circuit, wherein the reducing means are driven by energy provided from the energy conversion device. The disclosure also relates to a corresponding method for reducing or removing solidified phase change material.

BACKGROUND OF THE INVENTION

Systems for heating and/or cooling usually comprise a refrigerant circuit in which refrigerant is circulated. A class of these systems furthermore comprises a heat transfer circuit circulating a heat transfer medium. In some of these systems, the heat transfer medium can comprise or be a phase change material as a phase change slurry (PCS), for example. Such heating and/or cooling systems can be called as heating ventilation and cooling systems (HVAC), for example.

SUMMARY OF THE INVENTION

In conventional PCS HVAC systems, the slurry is either generated at a storage tank and then transported through the system or at heat exchange surfaces such as the heat exchanger or at heating terminals such as fan coil units. Crystals might be formed and disposed during the phase change process at the point of slurry generation in the system.

Some literatures propose providing a mechanical device for scrapping the deposited crystals off the generator or heat transfer surface. This proposal often requires extra energy input to operate such a scrapping device. The additional energy input reduces the efficiency of the system.

The problem to be solved by the present disclosure is therefore how to remove solidified phase change material from a component of the heat transfer circuit without using additional energy input.

This problem is solved by the heating and/or cooling system according to claim 1 and the method for reducing or removing solidified phase change material according to claim 13. The corresponding dependent claims describe advantageous embodiments of the system and the method.

The present disclosure relates to a heating and/or cooling system. The system can therefore be a system for heating and/or cooling a medium as for example air or water. The air can for example be the air of a room. Water can for example be water in a household.

The system can be a system for heating or alternatively a system for cooling. However, it can also be a system for heating and cooling, in which case the system can be switched between a heating mode and a cooling mode. The system can be for example be a heat pump or an air conditioner.

According to the disclosure the system comprises a refrigerant circuit, which is configured to circulate a refrigerant therein. Usually, such a refrigerant circuit comprises a number of components connected with each other by conduits or pipes. The refrigerant then flows between the components through the conduits or pipes. In an advantageous embodiment the refrigerant circuit can comprise a compressor, a condenser, one or more expansion means and an evaporator connected in this order in series by the pipes.

According to the present disclosure the refrigerant circuit comprises an energy conversion device which is configured to convert energy transported by the refrigerant into energy of a target form of energy. Here the energy conversion device can be any device which is capable of converting any kind of energy transported by the refrigerant into energy of any form, wherein the respective form of energy is denoted as target form of energy. In a preferred embodiment, the refrigerant can transport energy due to its motion and/or due to its pressure. Energy transported by the refrigerant due to its motion is for example kinetic energy. Energy transported by the refrigerant due to its pressure is for example potential energy which can be converted to a different form of energy by expanding the refrigerant. The target form of energy can be any suitable form of energy, as for example kinetic energy or mechanical energy in the form of rotation, vibration, pulsation and/or oscillation or other forms of mechanical energy. In another example the target form of energy can be electric energy generated by the energy conversion device. Any other form of energy suitable to be employed for driving the means for reducing and/or removing solidified phase change material described in the following can be employed.

The heating and/or cooling system according to the disclosure furthermore comprises a heat transfer circuit, which is configured to circulate a heat transfer medium. The heat transfer medium comprises or is a phase change material. This phase change material can for example be a phase change slurry (PCS) as mentioned above. The energy conversion device is configured to convert a form of energy of the circulated heat transfer medium into a different form of energy. The different form of energy drives the reducing means for reducing the phase change material.

The heat transfer circuit can comprise one or more components, which are for example connected with each other via pipes. The heat transfer medium can then circulate in these pipes through the one or more components. As described above the phase change material can form solidified parts within one or more of the components of the heat transfer circuit. Those one or more components were the formation of solidified phase change material as to be expected shall be denoted as concerned component in the following.

According to the disclosure the heat transfer circuit comprises reducing means for reducing and/or removing solidified phase change material from the concerned component of the heat transfer circuit. In principle, the inventive idea can be carried out with any kind of such reducing means.

According to the present disclosure the reducing means is configured to be driven by the energy of the target form of energy provided by the energy conversion device. This implies that the reducing means is connected to the energy conversion device via a connecting means which is configured to transfer the energy of the target form to the reducing means. Such transfer means can for example be a shaft, a rod, a belt, a gear, a gear box or similar means in cases where the target form of energy is mechanical energy. In cases where the target form is electric energy the transfer means can for example be electrically conductive elements as for example cables.

In many embodiments the solidified phase change material will form in a heat exchanger which can be comprised in the heating and/or cooling system between the refrigerant circuit and the heat transfer circuit and which can be configured to transfer heat between the refrigerant circuit and the heat transfer circuit. Usually such a heat exchanger will transfer heat from the refrigerant circuit to the heat transfer circuit in case of a heating system. In case of a cooling system the heat exchanger will usually transfer heat from the heat transfer circuit to the refrigerant circuit. In such systems the concerned component can therefore be this heat exchanger.

The present disclosure can in principle be carried out with any kind of reducing means which are suitable to reduce and/or remove solidified phase change material from the concerned component. Such means can for example be ultrasonic devices, piezoelectric devices, etc., to generate ultrasound, ultrasonic vibration, pulsating flow, etc.

Preferably the reducing means can be a heating device which is attached to a surface of the concerned component, for example a surface of the first heat exchanger, and/or a device for generating vibration on or within the concerned component, for example said heat exchanger, and/or a device for generating pulsating flow within the heat transfer medium, and/or a device comprising at least one rotating screw within the concerned component, which rotating screw runs at least partially along a flow path of the heat transfer medium within the concerned component, and/or the reducing means can comprise or be a scraping device within the concerned component, which at least partially runs along a cooling flow path within the concerned component, wherein such scraping device can for example comprise blades which can be brought into contact with that surface, on which the solidified phase change material is expected to be formed.

In a preferred embodiment the energy conversion device can comprise a generator which is configured to generate electric energy from the energy transported by the refrigerant. In this case the reducing means is preferably electrically driven and connected to the energy conversion device electrically for example by one or more cables.

In an advantageous embodiment the energy conversion device can comprise or be a turbine or a turbo expander. This kind of devices can produce for example a mechanical motion which can be transferred to the reducing means for example by mechanical transfer means as described above or which can be used to drive said generator producing electric energy.

In a preferred embodiment of the disclosure the refrigerant circuit can comprise expansion means, which can be part of the energy conversion device. Examples of such kind of expansion means are said turbine or said turbo expander. Here, the target form of energy is generated by expanding the refrigerant. These kind of expansion means therefore in particular use the energy transported by the refrigerant due to its high pressure.

In an advantageous embodiment the heat transfer circuit can comprise a storage device and/or a storage tank, which is configured for storing the heat transfer medium and/or the phase change material. Such a storage device or storage tank allows storing a certain amount of heat, which increases the flexibility of the heating and/or cooling achieved by the system.

BRIEF DESCRIPTION OF THE DRAWINGS

In the following the disclosure shall be described by way of examples with reference to some figures. The features described with respect to these examples can also be realized independently from the respective example and can be combined between different examples.

DETAILED DESCRIPTION OF EMBODIMENTS

Figure 1:
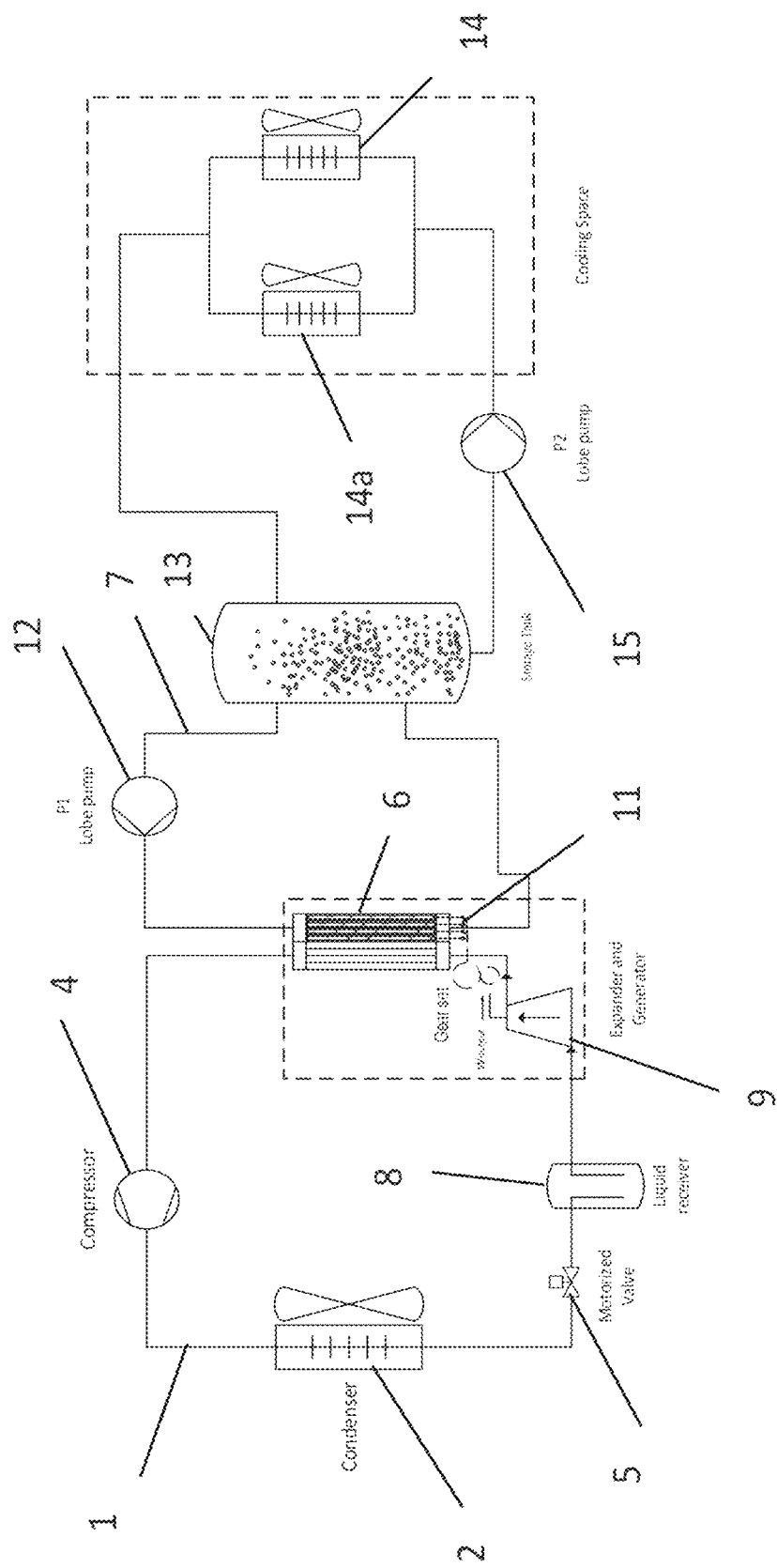
FIG. 1 shows a heating and/or cooling system according to the disclosure.

FIG. 1 shows a heating and/or cooling system according to the present disclosure. In FIG. 1, the system shall be regarded as a heating system or a cooling system, where the direction of flow of refrigerant in the refrigerant circuit 1 decides whether the system is a heating system or a cooling system. Systems can also be designed to be capable of both, heating and cooling, by introducing a suitable four-way valve into the refrigerant circuit 1.

The system shown in FIG. 1 comprises a refrigerant circuit 1 configured to circulate a refrigerant therein. The refrigerant circuit comprises a condenser 2, which together with a fan 3 forms a fan coil unit. The refrigerant circuit 1 in this example furthermore comprises a compressor 4 which is configured to compress the refrigerant circulating in the refrigerant circuit 1. The refrigerant in FIG. 1 furthermore comprises a motorized valve 5. The refrigerant circuit 1 furthermore comprises a heat exchanger 6, which can exchange heat between the refrigerant circuit 1 and a heat transfer circuit 7. It furthermore has an optional liquid receiver 8.

According to the present disclosure an energy conversion device is included in the refrigerant circuit 1. In the example in FIG. 1, this energy conversion device 9 has an expander and a generator, which is configured to expand the refrigerant flowing in the refrigerant circuit 1 and to thereby drive the generator producing electric energy. The energy conversion device 9 is configured to convert a form of energy of the circulated heat transfer medium into a different form of energy. Also, the energy conversion device 9 is configured for converting energy transported by the refrigerant into energy of a target form of energy.

The heat transfer circuit 7 comprises a pump 12, here a lobe pump 12, for moving a heat transfer medium within the heat transfer circuit 7. According to the disclosure the heat transfer medium comprises or is a phase change material, in particular a phase change slurry. The pump 12 is connected to a heat transfer circuit side of the heat exchanger 6 with one side as well as to an optional storage tank 13 with its opposite side.

The storage tank 13 is connected to two indoor units 14a and 14b. A further pump 13 is arranged between a port of the storage tank 13, which is here at the lowest point of the storage tank 13, and ports of the indoor units 14a and 14b, which are opposite to the ports of these indoor units 14a and 14b, which are directly connected to the storage tank 13.

In the system shown in FIG. 1 the refrigerant circulates as follows: Starting from the compressor 4, the compressor 4 compresses the refrigerant and increases its pressure. The refrigerant having increased pressure output by the compressor is conducted via a pipe to a first port of the condenser 2. Within the condenser 2 the refrigerant reduces its enthalpy h and condenses to liquid refrigerant. The fan 3 enhances the energy transmission between the condenser and the surrounding environment.

The liquid refrigerant leaves the condenser 2 through a second port and is then guided by a pipe to the valve 5. From a valve 5 the liquid refrigerant is guided via another pipe to the liquid receiver 8 ensuring continuous supply of liquid refrigerant. From the liquid receiver 8 the refrigerant is conducted via a pipe to the energy conversion device 9, here the expander and generator. Within the expander and generator the refrigerant is expanded, that is its pressure is reduced. If the expansion device 9 was just an expansion valve, the expansion process would happen Isentropic. If the energy conversion device is a turbo expander 9 in FIG. 1 this process of expansion can happen at constant specific enthalpy h. The energy set free by the expansion process drives an electric generator, for example via a gear set 10. After leaving the expander and generator 9 the refrigerant enters the refrigerant circuit side of the heat exchanger 6, where heat is exchanged between the refrigerant and the heat transport medium in the heat transfer circuit 7. Here the refrigerant side of the heat exchanger 6 comprises an evaporator in which the refrigerant increases its specific enthalpy and evaporates into the gas phase.

In the following the flow of heat transport medium, including the phase change material, within the heat transfer circuit 7 is explained. The heat transfer medium leaves the heat transfer circuit side of the heat exchanger 6, in case of cooling operation after having lost energy in the heat exchanger 6. The heat transfer medium is conducted via a pipe to a lower left port of the storage tank 13. The pump 15 is connected to a port of the storage tank 13 in the bottom of the storage tank 13 via a pipe, and with its opposite port is connected to ports of the indoor units 14a and 14b. The pump 15 can pump heat transfer medium from this port in the tank 13 to the indoor units 14a and 14b. The indoor units 14a and 14b each comprise a heat exchanger which can exchange heat with surrounding medium, such as air in a room. Here the heat exchangers of the indoor units 14a and 14b are arranged in parallel. Each indoor unit comprises a fan. After having flown through the heat exchangers of the indoor units 14a and 14b, the heat transfer medium is collected in a common pipe which is connected to a further port on the upper right of the tank 13. Via this pipe, the heat transfer medium flows into the tank 13. An upper left side port of the tank 13 is connected via pipes and the pump 12 is connected to an upper port of the heat transfer circuit side of the heat exchanger 6. Pump 12 can pump the heat transfer medium from the tank 13 to the heat exchanger 6.

In the example shown in FIG. 1, the heat exchanger 6 on the heat transfer circuit side comprises a reducing means 11 which is configured for reducing and/or removing solidified phase change material from the heat transfer medium side of the heat exchanger 6. This reducing means 11 is configured to be driven by the energy provided by the generator 9. It should be noted that it is also possible to transfer mechanical energy from the expander 9 to a mechanically driven reducing means 11. The energy conversion device 9 and the reducing means 11 can be any of those described above. Energy of a suitable form can be transferred from the energy conversion device 9 to the reducing means 11.

Some examples of suitable reducing means and slurries can be found in the publication "An overview of fundamental studies and applications of phase change material slurries to secondary loop refrigeration and air conditioning systems", Renewable and Sustainable Energy Reviews 16 (2012) 5021-5058, which provides an overview over these techniques.

The energy conversion means 9 can be a turbo expander as described above, but not limited to this example. For example, the energy conversion means 9 can be a turbine.

Figure 2:
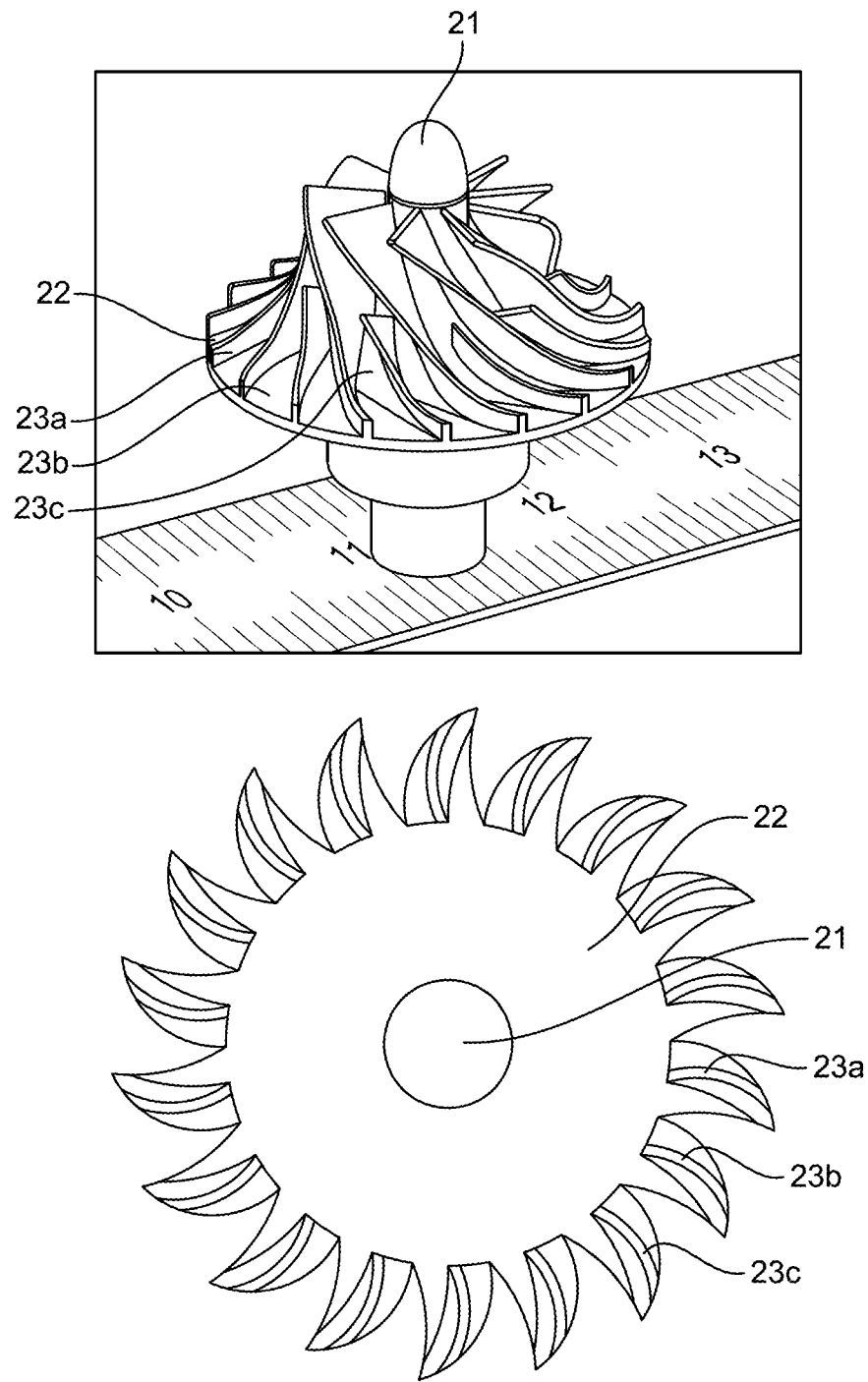
FIG. 2 shows an example of a turbine.

FIG. 2 shows an example of a turbine which can be employed as the energy conversion means 11 shown in FIG. 1. Such a turbine comprises a plurality of fins 23a, 23b, 23c, arranged around a shaft 21. In the example shown in FIG. 2 the fins 23a, 23b, 23c have a shape such that each fin in the direction of the shaft 21 reduces its radial extension. At the same time each fin proceeds in circumferential direction around the shaft 21 with increasing distance in the direction of the shaft 21. Each fin therefore forms an acute angle with a plane to which the shaft 21 is perpendicular. In the circumferential direction each second fin 23b has half the extension in direction of the shaft compared to its neighbouring fins 23a, 23c. The shape of the turbine and in particular the fins 23a, 23b, 23c is such that if a fluid flows onto the fins with the flowing direction parallel to the length of the shaft 21 a torque is effected on the turbine. This torque rotates the turbine about the shaft 21. This rotational energy can be employed to drive the reducing means 21.

Figure 3:
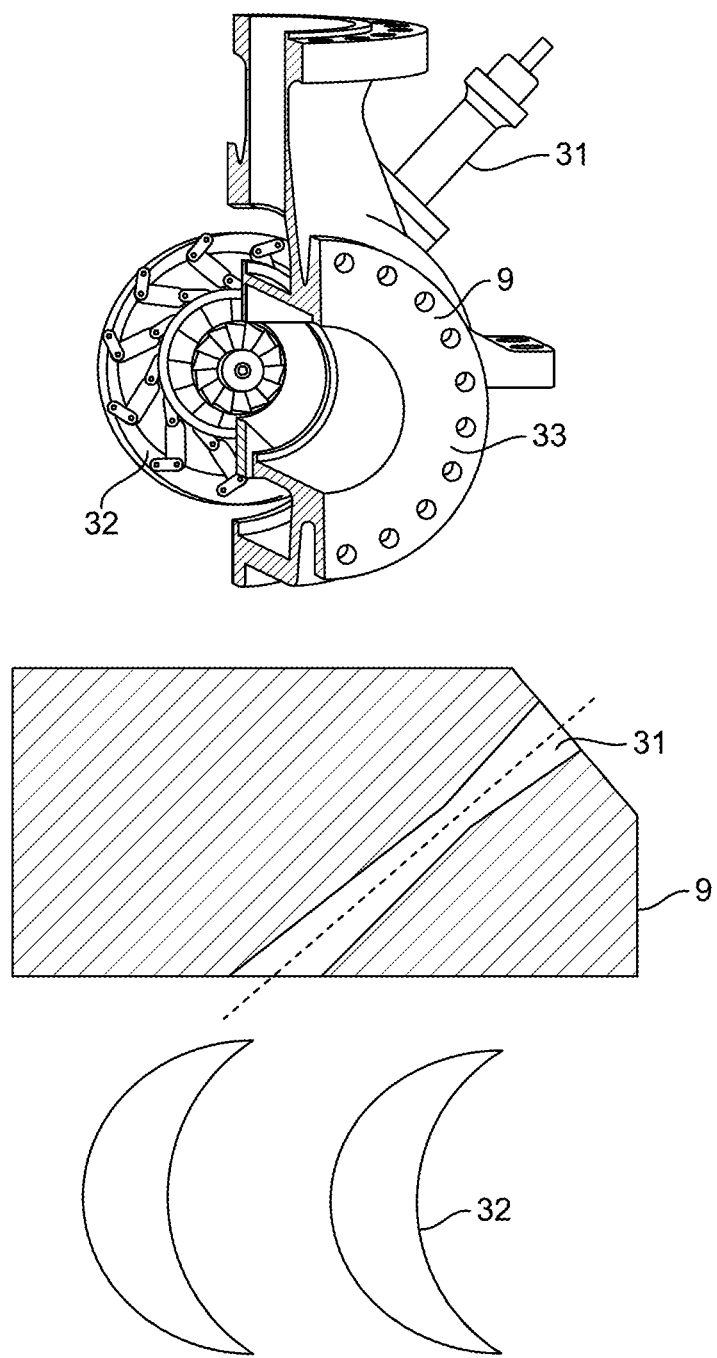
FIG. 3 shows an example of a turbo expander.

FIG. 3 shows an example of a turbo expander which can be used as expansion means 9, shown in FIG. 1. The upper part of the figure shows a perspective view and the lower part shows a schematic cross sectional view through a part of a turbo expander. The turbo expander has a rotor 32 with multiple blades. A fluid is guided onto the blades of the rotor via a conduit and nozzle 31 and thereby effects a rotation on the rotor. The rotor can be coupled to suitable means for generating the energy form which is desired. For example the rotor can be coupled to an electric generator to produce electric energy. In the lower part of the figure the nozzle is embedded in a housing of the turbo expander and a cross section through only two of the blades is shown.

Figure 4:
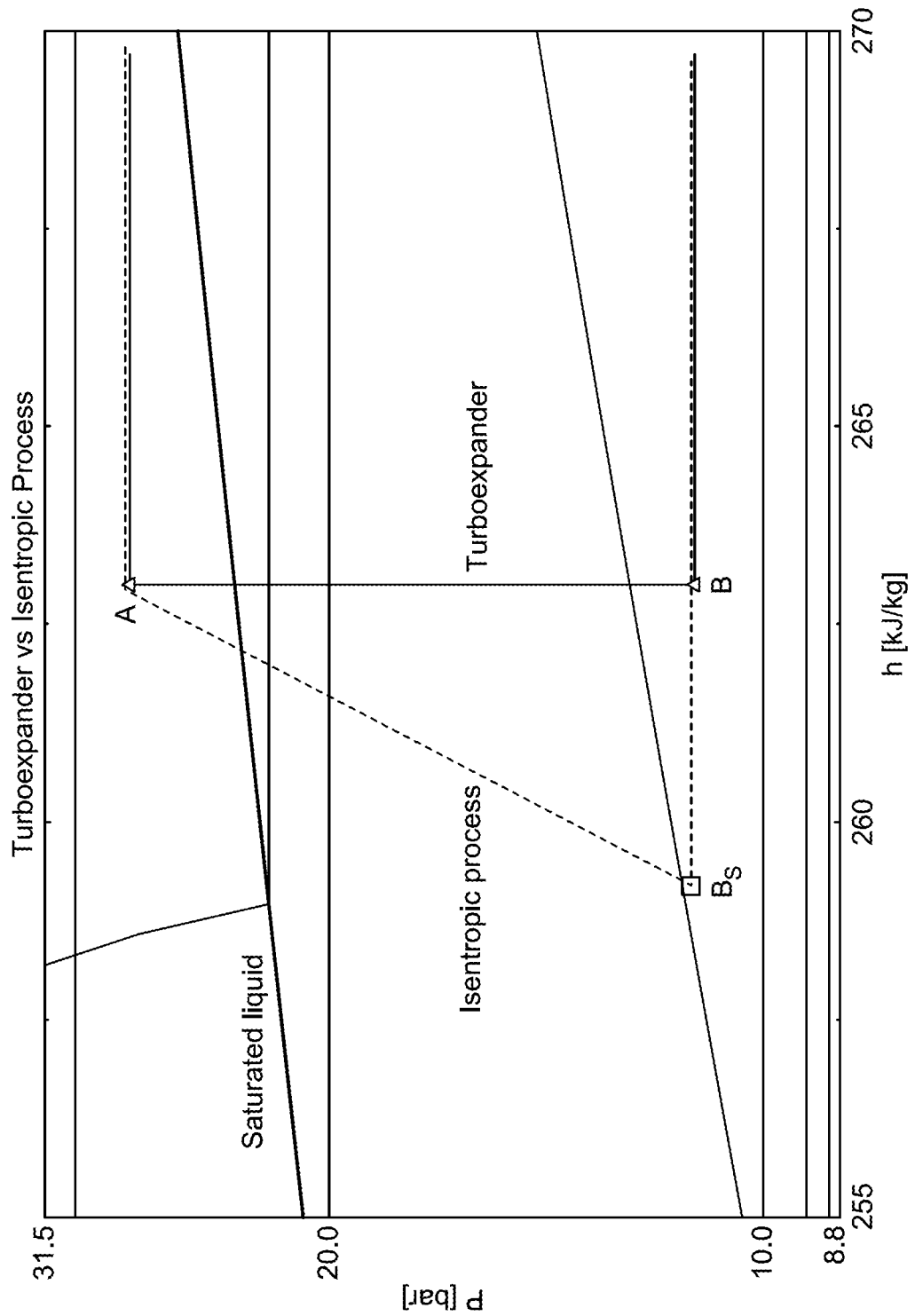
FIG. 4 shows the effect of the present disclosure in a P-h diagram.

FIG. 4 shows a P-h-diagram showing part of the thermodynamic cycle which the refrigerant circuit goes through. The dashed line between points A and Bs shows the behaviour in an isentropic process while the full line between A and B shows the behaviour using a turbo expander. The other lines are usual iso-lines of the usual P-h-Diagram. This example shows that a turbo expander or a turbine can be used in a system as described in the present disclosure.

As described above, the heating and/or cooling system with a heat transfer medium in which a phase change material to be solidified is contained, comprises: a circuit 7 configured to circulate the heat transfer medium; a reducing means 11 for reducing the phase change material having been solidified in the heat transfer medium; and a energy conversion device 9 configured to convert a form of energy of the circulated heat transfer medium into a different form of energy. The different form of energy drives the reducing means 11.

Also, as described above, the heating and/or cooling system may comprise a refrigerant circuit 1 configured to circulate a refrigerant therein. In the case, the refrigerant circuit 1 comprises an energy conversion device 9. The energy conversion device 9 may be configured for converting energy transported by the refrigerant into energy of a target form of energy. The heating and/or cooling system further comprises a heat transfer circuit 7 configured for circulating a heat transfer medium. The heat transfer medium is or comprises a phase change material. The heat transfer circuit 7 comprises reducing means 11 for reducing and/or removing solidified phase change material from a concerned component of the heat transfer circuit 7. The reducing means 11 is configured to be driven by the energy of the target form of energy provided by the energy conversion device 9.

The invention claimed is:

1. Heating and/or cooling system with a heat transfer medium in which a phase change material to be solidified is contained, comprising:
   a circuit, configured to circulate the heat transfer medium;
   a reducing means for reducing the phase change material having been solidified in the heat transfer medium; and
   an energy conversion device configured to convert a form of energy of the circulated heat transfer medium into a different form of energy, wherein
   the different form of energy drives the reducing means for reducing the phase change material.

2. Heating and/or cooling system according to claim 1, wherein the reducing means reduces the phase change material from a concerned component of the heat transfer circuit.

3. Heating and/or cooling system according to claim 2, comprising:
   a refrigerant circuit configured to circulate a refrigerant therein; and a heat exchanger for transferring heat between the refrigerant circuit and the heat transfer medium,
   wherein the concerned component is the heat exchanger.

4. Heating and/or cooling system according to claim 2, wherein the reducing means comprise any of the following:
   a heating device attached to the concerned component,
   a device for generating vibrations on and/or in the concerned component,
   a device for generating a pulsating flow of the heat transfer material,
   a rotating screw within the concerned component that runs at least partially along a heat transfer medium flow path within the concerned component,
   a scraping device within the concerned component, that at runs at least partially along a heat transfer medium flow path within the concerned component, the scraping device comprising at least one blade in contact or contactable with a surface of the concerned component, which surface is in contact with the heat transfer medium during operation of the heating and/or cooling system,
   a device for impinging ultra sound on the concerned component,
   a device comprising at least one piezoelectric transducer.

5. Heating and/or cooling system according to claim 3, wherein the energy conversion device comprises a generator configured to generate electric energy from the energy transported by the refrigerant,
   wherein the reducing means is electrically driven, and
   wherein the energy conversion device and the reducing means are connected electrically.

6. Heating and/or cooling system according to claim 1, wherein the energy conversion device comprises or is a turbine or a turbo expander.

7. Heating and/or cooling system according to claim 6, wherein the turbine or the turbo expander is connected to the reducing means by a shaft.

8. Heating and/or cooling system according to claim 6, wherein the reducing means is connected to the energy conversion device via a gearbox and/or a belt.

9. Heating and/or cooling system according to claim 3, wherein the refrigerant circuit comprises expansion means, wherein the expansion means is part of the energy conversion device, and wherein the energy conversion device generates the target form of energy by expanding the refrigerant.

10. Heating and/or cooling system according to claim 3, wherein the refrigerant circuit comprises a compressor, a condenser, and an evaporator.

11. Heating and/or cooling system according to claim 1, wherein the circuit comprises a storage device and/or storage tank configured for storing the heat transfer medium and/or the phase change material.

12. Heating and/or cooling system according to claim 1, wherein the heat transport medium comprises or is a phase change slurry.

13. Method for reducing or removing solidified phase change material from a concerned component of a circuit configured to circulate a heat transfer medium,
   wherein a form of energy transported by the heat transfer medium is converted to a different form of energy, and the energy of the different form of energy output produced by this converting is used to reduce the solidified phase change material from the concerned component.

14. Method according to claim 13, wherein the method is carried out by a heating and/or cooling system.

* * * * *